United States Patent

Mouquet et al.

(10) Patent No.: US 9,537,708 B2
(45) Date of Patent: Jan. 3, 2017

(54) METHOD FOR SELECTING A DEVICE IN A TELECOMMUNICATIONS NETWORK

(75) Inventors: Antoine Mouquet, Courbevoie (FR); Delphin Barankanira, Antony (FR)

(73) Assignee: Orange, Paris (FR)

( * ) Notice: Subject to any disclaimer, the term of this patent is extended or adjusted under 35 U.S.C. 154(b) by 309 days.

(21) Appl. No.: 13/508,210

(22) PCT Filed: Nov. 4, 2010

(86) PCT No.: PCT/FR2010/052367
§ 371 (c)(1),
(2), (4) Date: May 4, 2012

(87) PCT Pub. No.: WO2011/055082
PCT Pub. Date: May 12, 2011

(65) Prior Publication Data
US 2012/0225653 A1 Sep. 6, 2012

(30) Foreign Application Priority Data

Nov. 5, 2009 (FR) ...................................... 09 57848

(51) Int. Cl.
H04W 4/00 (2009.01)
H04L 29/12 (2006.01)
H04L 29/06 (2006.01)

(52) U.S. Cl.
CPC ... *H04L 29/12066* (2013.01); *H04L 29/12188* (2013.01); *H04L 61/1511* (2013.01); *H04L 61/1588* (2013.01); *H04L 61/303* (2013.01); *H04L 65/1006* (2013.01); *H04L 65/1016* (2013.01); *H04L 65/1073* (2013.01)

(58) Field of Classification Search
CPC ......... H04W 4/02; H04W 60/00; H04W 64/00
See application file for complete search history.

(56) References Cited

U.S. PATENT DOCUMENTS 6,587,455 B1 * 7/2003 Ray et al. ...................... 370/352
6,643,658 B1 * 11/2003 Jai et al.
(Continued)

FOREIGN PATENT DOCUMENTS

EP 1973295 A1 9/2008

OTHER PUBLICATIONS

Search Report issued in parent application FR0957848, Jul. 13, 2010, pp. 1-2.
(Continued)

*Primary Examiner* — Vladimir Magloire
*Assistant Examiner* — Shantell Heiber
(74) *Attorney, Agent, or Firm* — Drinker Biddle & Reath LLP (57) ABSTRACT

A method is provided for selecting a device in a telecommunications network in accordance with characteristics relating to the implementation of a telecommunications service, comprising the following steps: a) receiving a set of characteristics relating to said service; b) forming a first symbolic address for querying an address server, using at least one portion of the overall characteristics of the set on the one hand, and an address domain name on the other hand; c) sending the first address to the address server; d) receiving a list of one or more devices compatible with the characteristics; and e) selecting one device from the list.

11 Claims, 8 Drawing Sheets

(56) References Cited

U.S. PATENT DOCUMENTS

| | | | |
|---|---|---|---|
| 8,069,237 B2* | 11/2011 | Yoshida et al. | 709/223 |
| 2002/0019243 A1* | 2/2002 | Zhang et al. | 455/466 |
| 2005/0101335 A1* | 5/2005 | Kelly et al. | 455/456.3 |
| 2006/0174009 A1* | 8/2006 | Martiquet et al. | 709/227 |
| 2007/0135121 A1* | 6/2007 | Bae et al. | 455/432.1 |
| 2008/0281949 A1* | 11/2008 | Aborn | 709/222 |
| 2009/0005052 A1* | 1/2009 | Abusch-Magder et al. | 455/446 |
| 2009/0061775 A1* | 3/2009 | Warren et al. | 455/41.2 |
| 2010/0316063 A1* | 12/2010 | Zhou et al. | 370/431 |
| 2011/0051174 A1* | 3/2011 | Hattori | 358/1.15 |

OTHER PUBLICATIONS

International Search Report issued in parent application PCT/FR2010/052367, Mar. 16, 2011, pp. 1-3.

"3rd Generation Partnership Project; Technical Specification Group Services and System Aspects; Feasibility Study on IMS Evolution; (Release 9)", 3GPP Standard; 3GPP TR 23.812, 3rd Generation Partnership Project, Sophia-Antipolis, France, Apr. 1, 2009, V0.5.1, pp. 1-26.

Gulbrandsen, et al., "A DNS RR for specifying the location of services (DNS SRV)", IETF Standard, Internet Engineering Task Force, IETF, Switzerland, Feb. 1, 2000, 13 pages.

"3rd Generation Partnership Project; Technical Specification Group Core Network and Terminals; IP Multimedia (IM) Subsystem Cx and Dx interfaces; Signalling flows and message contents (Release 8)", 3GPP Standard; 3GPP TS 29.228, 3rd Generation Partnership Project, Sophia-Antipolis, France, Sep. 1, 2009, V8.6.0, pp. 1-65.

Vixie, et al., "Dynamic Updates in the Domain Name System (DNS Update)", IETF RFC 2136, Internet Engineering Task Force, IETF, Switzerland, Apr. 1, 1997, 24 pages.

"Digital cellular telecommunications system (Phase 2+); Universal Mobile Telecommunications System (UMTS); LTE; IP Multimedia Subsystem (IMS); Stage 2 (3GPP TS 23.228 version 8.10.0 Release 8)", 3GPP Standard; ETSI TS 123 228, 3rd Generation Partnership Project, Sophia-Antipolis, France, Oct. 1, 2009, V8.10.0, pp. 1-250.

"Digital cellular telecommunications system (Phase 2+); Universal Mobile Telecommunications System (UMTS); LTE; Internet Protocol (IP) multimedia call control protocol based on Session Initiation Protocol (SIP) and Session Description Protocol (SDP); Stage 3 (3GPP TS 24.229 version 5.23.0 Release 5)", 3GPP Standard; ETSI TS 124 229, 3rd Generation Partnership Project, Sophia-Antipolis, France, Oct. 1, 2009, V5.23.0, pp. 1-262.

* cited by examiner

| | 41 | 42 | 43 | 44 |
|---|---|---|---|---|
| COMBIN1 | | EQUIP11 | ADR-IP11 | PARAM11 |
| | | EQUIP12 | ADR-IP12 | PARAM12 |
| | | ⋮ | | |
| COMBIN2 | | EQUIP21 | ADR-IP21 | PARAM21 |
| | | EQUIP22 | ADR-IP22 | PARAM22 |
| | | ⋮ | | |
| COMBIN3 | | EQUIP31 | ADR-IP31 | PARAM31 |
| | | EQUIP32 | ADR-IP32 | PARAM32 |
| | | ⋮ | | |

METHOD FOR SELECTING A DEVICE IN A TELECOMMUNICATIONS NETWORK

CROSS-REFERENCE TO RELATED APPLICATIONS

This application is the U.S. national phase of the International Patent Application No. PCT/FR2010/052367 filed Nov. 4, 2010, which claims the benefit of French Application No. 09 57848 filed Nov. 5, 2009, the entire content of which is incorporated herein by reference.

The present invention relates to the field of telecommunications.

FIELD

More particularly, it relates to the selection of devices for use thereof in carrying out a communication over a telecommunications network.

BACKGROUND

Within the framework of the 3GPP project ("Third Generation Partnership Project"), a new telecommunications network architecture called IMS ("IP Multimedia Subsystem") has been proposed.

This new architecture allows operators of this type of networks to offer new services to different types of users (fixed or mobile), while still being compatible with the telecommunications networks of earlier generations.

Thus, the new-generation networks must be able to implement communications of very different types according to the case in point.

To this end, when a user registers with the telecommunications network, the 3GPP standard proposes to identify the user as well as a list of characteristics linked to this user, and to select network resources accordingly in order to prepare for subsequent implementation of communications.

Figure 1A:
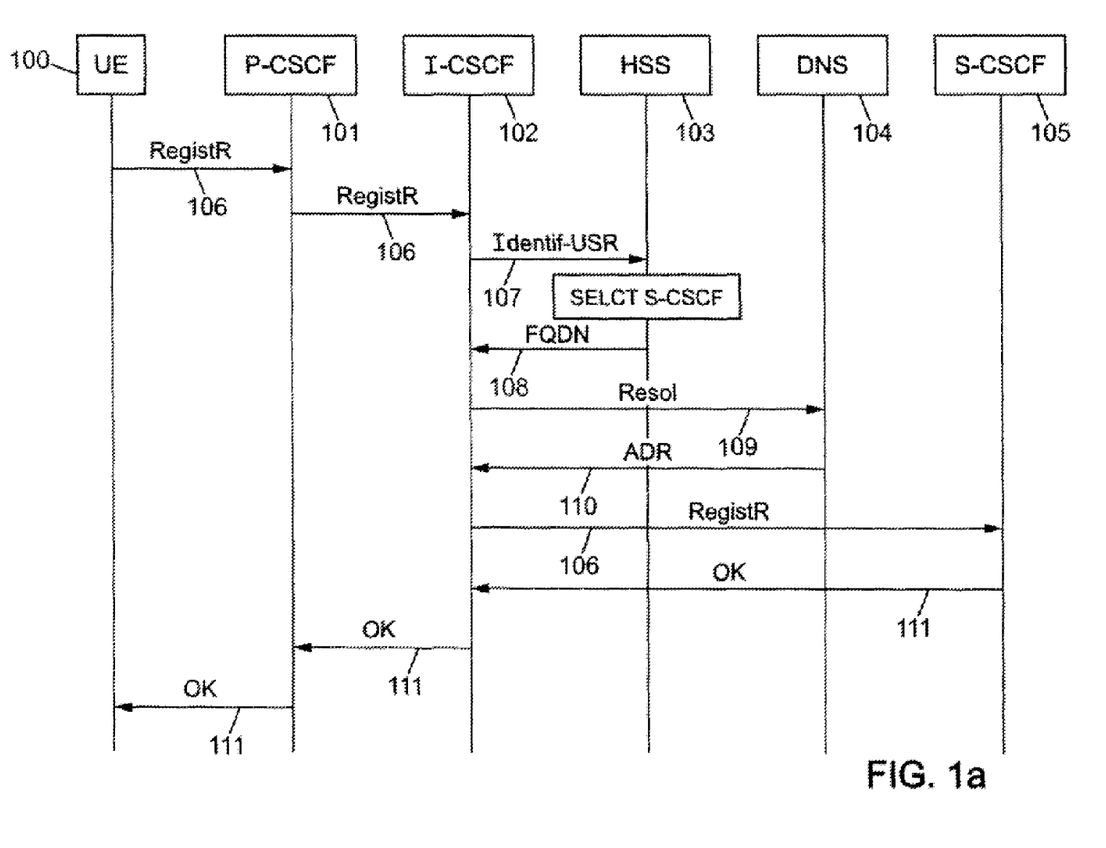
FIGS. 1a and 1b are protocol sequence diagrams showing exchanges between different entities according to TS 23.228 and TS 24.229 of the 3GPP Standard.
Figure 1B:
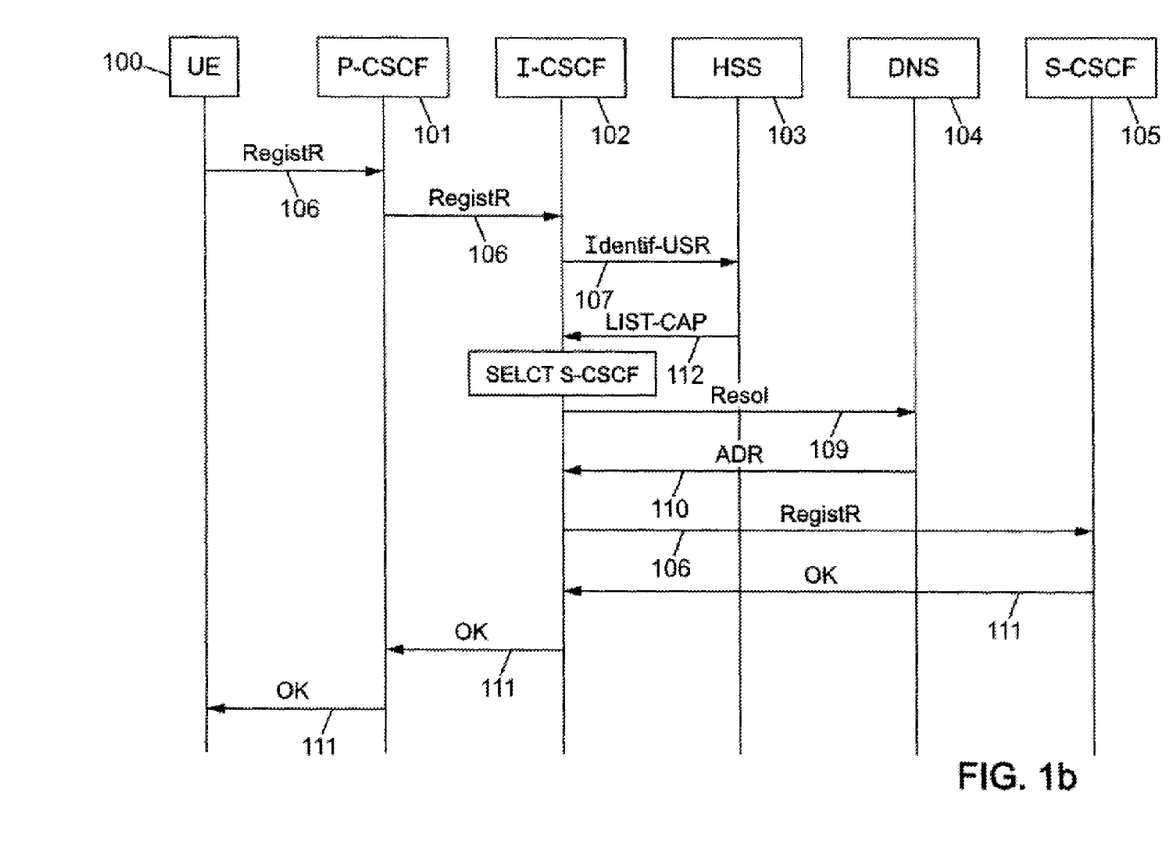

A brief description of this selection as recommended in documents TS 23.228 (section 5.2.2.3) and TS 24.229 (section 5.3.1.2) of the 3GPP standard is given with reference to FIGS. 1a and 1b.

FIG. 1 is a protocol sequence diagram showing the exchanges between a user device 100, an access unit 101 of the P-CSCF ("Proxy-Call Session Control Function") type, a query unit 102 of the I-CSCF ("Interrogating-Call Session Control Function") type, an authentication server 103 of the HSS ("Home Subscriber Server") type, an address server 104 of the DNS ("Domain Name Server") type, and a service unit 105 of the S-CSCF ("Serving-Call Session Control Function") type.

When the user device connects to the telecommunications network, it issues a registration request 106 to the access unit 101 in order to be identified on the network. The access unit 101 acts as an input point on the network for the user device. Next, the access unit 101 transmits the request to the query unit 102 which will take responsibility for identifying the service unit 105 which will process this registration request and manage the user's communications.

To this end, the query unit 102 issues an identification request 107 to the authentication server 103. The authentication server 103 then verifies if the user is already registered or not and if the user is already associated with network resources or not.

The case where the user is not registered is discussed herein.

The authentication server 103 then selects a service unit 105 to be assigned to the user device for the communication and next delivers an identifier 108 called FQDN ("Fully Qualified Domain Name") to the query unit 102. This identifier represents a symbolic address on the network of the service unit 105 to be assigned to the user.

The query unit 102 then interrogates the address server 104, sending the request 109 comprising the FQDN in order to know the physical address (IP address) of the service unit 105 based on the FQDN. The address server 104 provides in response the physical address 110 of the service unit 105.

The query unit 102 then transmits the request 106 to the service unit 105, which takes responsibility for authenticating the user to the authentication server 103. Next, the service unit returns a registration acceptance message 111 to the query unit 102 which transmits it to the user device via the access unit.

A further example of registration is now described, with reference to FIG. 1b. FIG. 1b repeats the different elements described with reference to FIG. 1a, and the registration starts in the same way as previously, until the authentication server 103 receives the identification request 107.

This time, instead of selecting the service unit and sending a symbolic address of the latter, the authentication unit sends to the query unit 102 a list 112 of characteristics attached to the user profile. These characteristics are also called "capabilities" in the above-mentioned standard.

On receiving the list of capabilities, the query unit selects a service unit compatible with the capabilities in the list. The query unit then sends the request 109 to the address server in order to know the physical address of the service unit selected based on its FQDN.

The address server then returns the physical address of the service unit and the registration continues as described previously.

The selection of the service unit as recommended in the standard cited above presents a certain number of problems.

The operator must associate a group of service units with each symbolic address. Thus, once the query unit has chosen a FQDN, it only receives the physical address of the associated service units. This limits the final choice of the service unit to be used, and prevents the best choice being made, for example if the service units associated with the chosen FQDN have a load level that is too high. The association initially set by the operator fixes once and for all the service unit choice strategy to be used.

The selection of the service unit therefore lacks flexibility, and does not always allow the best choice.

Moreover, it is the query unit that makes the choice of the service unit based on capabilities. Thus, the operator must ensure that all the query units of the network have an updated list of all the capabilities of the network, all the service units of the network, and all the correspondences between these service units and these capabilities.

Managing the network thus remains complex for the operator.

SUMMARY

The purpose of the present invention is to improve the situation.

To this end, according to a first aspect of the invention, a method is proposed for selecting a device in a telecommunications network as a function of characteristics associated with the implementation of a telecommunications service, comprising the following steps:

a) receiving a set of characteristics associated with said service;

b) forming a first symbolic address for interrogating an address server, based on at least one part of the characteristics of the set on the one hand, and an address domain name on the other hand;

c) transmitting the first address to the address server;

d) receiving a list of one or more devices compatible with said at least one part of the characteristics of the set; and e) selecting a device from the list.

The characteristics are for example capabilities such as those defined by the 3GPP standard.

The characteristics represent for example a profile of a subscriber to a telecommunications network, the types of communications that the subscriber is capable of implementing, a security level to be provided for the communication, a geographical location of the user device, or other.

For example, forming the symbolic address comprises a concatenation of symbols representing the at least one part of the characteristics of the set, with the domain name.

Also, for example, the characteristics are represented by one or more symbols, and forming the symbolic address comprises the steps of:

classifying the at least one part of the characteristics of the set;

concatenating the symbols of the characteristics according to the classification used; and concatenating the string of concatenated symbols with the address domain name.

For example, the symbols are positive integers coded on a number of bits, and the classification is a classification in descending order.

The classification allows in particular the same list of characteristics to be obtained using different disordered sets of the same characteristics.

Forming the symbolic address according to the invention allows simple and rapid interrogation of the address server which can then rapidly select one or more devices according to the characteristics.

For example, an address server such as a DNS can be used, in order to benefit from the performance of this type of hardware. Address servers have a low cost while providing great robustness and a high level of reliability. Moreover, this type of hardware makes it possible to share the request load over the network.

The choice of the device in the list can be made according to different criteria such as for example geographical proximity, working load or other.

For example, the method relates to selecting a call session control unit such as a service unit, during the registration of a user.

Within the framework of an IMS network, the call session control unit selected can for example be a unit of the S-CSCF type.

The list of devices can comprise for each device a second physical address of the latter on the network.

The list of devices can also comprise for each device, a field representing a current usage load parameter of said device.

Thus, the selection of the device can be based on the current load parameter of the devices on the list.

In embodiments, the set of characteristics comprises main characteristics and secondary characteristics; step b) is executed with the main characteristics and the secondary characteristics, the method comprising moreover the steps of:

f) preselecting from the list of devices received during step d), the device having the least load;

g) load test of the device preselected during step f) as a function of the associated load parameter; and h) selecting the device preselected during step f) if the load test in step g) is satisfied, or, if not i) repeating steps b) to d), with said main characteristics and without said secondary characteristics;

f) preselecting from the list of devices received during step i), the device that has the least load;

g) load test of the device preselected during step j) as a function of the associated load parameter and comparison of a load difference between the device preselected during step f) and the device preselected during step j) with a threshold; and l) selecting the device preselected during step j) if the load test in step k) is satisfied and if the difference is greater than the threshold, or if not, the device preselected during step f).

The iterative process according to these embodiments allows a compromise to be made between the load of the devices capable of being selected and the possibility of implementing all the desired characteristics, including the secondary (or optional) characteristics.

In other embodiments, the set of characteristics comprises main characteristics and secondary characteristics; step b) is executed with said main characteristics and said secondary characteristics, the method comprising moreover the steps of:

m) load test of the devices on the list of devices received during step d), as a function of the load parameters associated with the devices;

then if the test in step m) is not satisfied for any of the devices on the list:

n) preselecting from the list of devices received during step d), the device having the least load;

o) repeating steps b) to d), with said main characteristics and without said secondary characteristics;

p) preselecting from the list of devices received during step o), the device having the least load;

q) load test of the device preselected during step p) as a function of the associated load parameter and comparison of a load difference between the device preselected during step n) and the device preselected during step p) with a threshold; and r) selecting a device from the list received during step o) by a random selection weighted by load parameters if the test in step q) is satisfied and if the difference is greater than the threshold, or if not, the device preselected during step n); or, if the test in step m) is satisfied:

s) selecting a device from the list received during step d) by a random selection weighted by the load parameters.

According to a second aspect of the invention, an address server is provided comprising a memory unit for storing an address table, this table comprising:

entries for combinations of characteristics for communication over a telecommunications network to which the server belongs;

for each entry, a list of devices in the network that are compatible with the corresponding combination of characteristics;

for each device in the list, a data field for a load parameter of use of the device, and a data field for locating the device on the network.

This address server can rapidly and efficiently choose the devices according to the desired characteristics For example, the address server comprises moreover an entry for receiving a symbolic address obtained by implementation of the method according to the first aspect, and a processor unit for choosing an entry from the corresponding address table.

According to other aspects of the invention, there is provided:

a computer program comprising instructions for the implementation of a method according to the first aspect of the invention when the programme is executed by a processor, for example, the processor of a network management device such as a query unit of an IMS-type network;

a computer-readable media on which such a computer program is stored; and a network management device for the implementation of a method according to the first aspect of the invention.

The advantages achieved by the computer program, the computer-readable media, and the device, as briefly disclosed above, are at least identical to those mentioned above in connection with the method according to the invention.

BRIEF DESCRIPTION OF THE DRAWINGS

Other features and advantages of the invention will also become apparent on reading the following description. The latter is purely illustrative and must be read with reference to the attached drawings in which.

DETAILED DESCRIPTION

Figure 2:
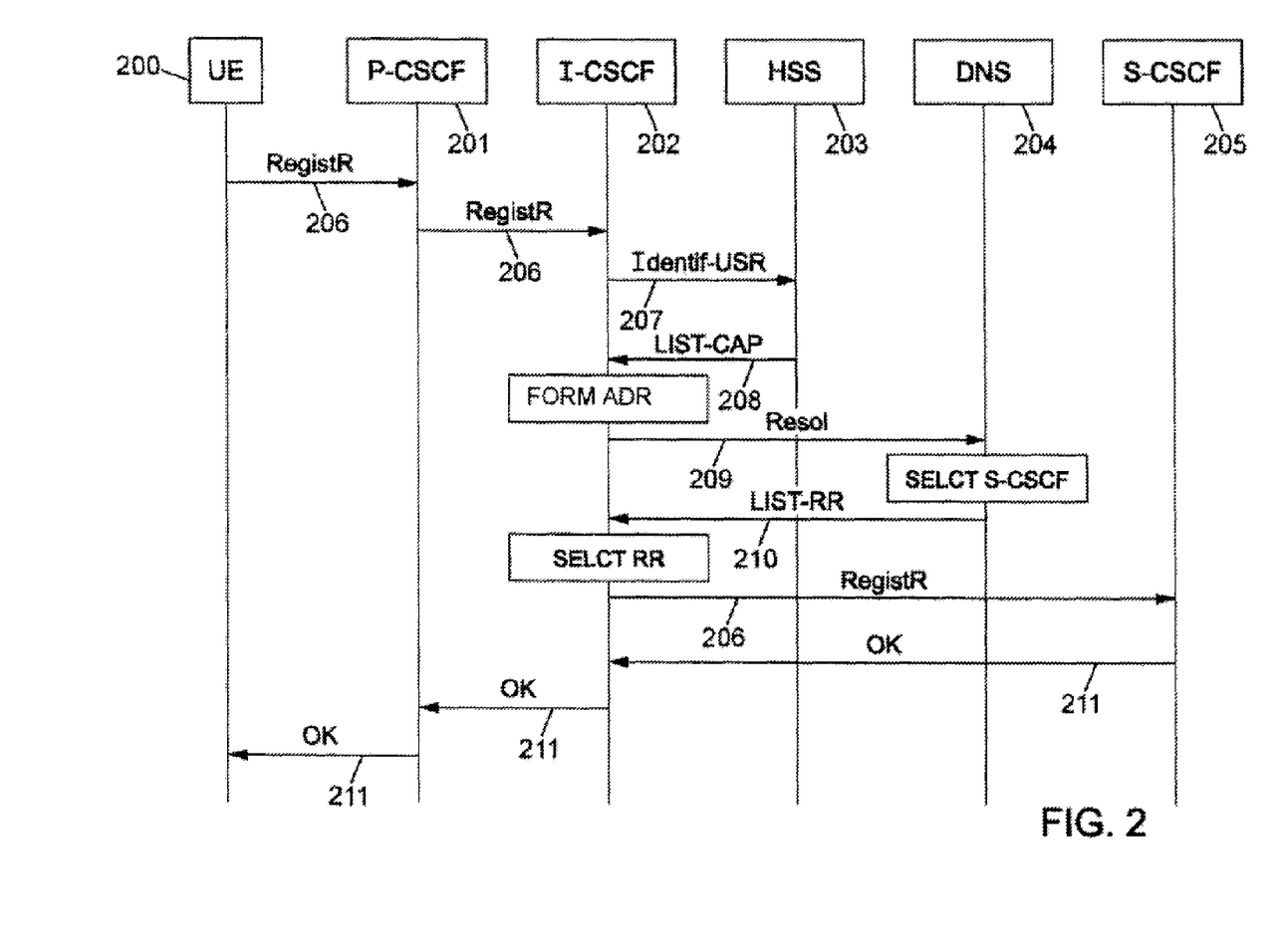
FIG. 2 shows the exchanges between different entities implemented in a method according to an embodiment of the invention.
Figure 3:
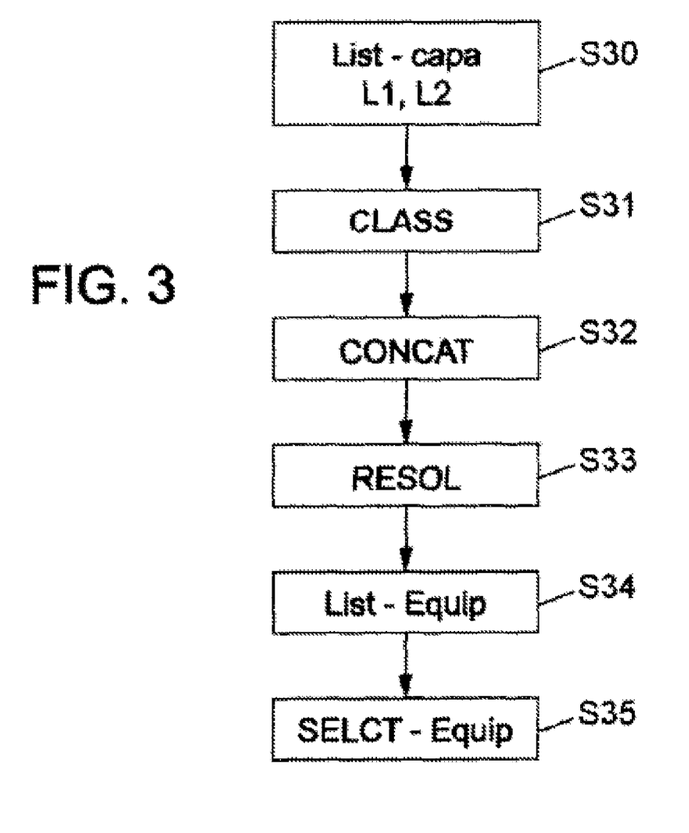
FIG. 3 is a flowchart showing steps implemented in a method according to an embodiment of the invention.

An implementation in a general context of an embodiment of the invention is now described, with reference to FIGS. 2 and 3. FIG. 2 represents exchanges between different entities implemented, and FIG. 3 is a flow chart showing steps implemented.

A user device 200 wishes to register in order subsequently to implement communications on a telecommunications network. For example, this is an IMS-type telecommunications network according to the 3GPP standard.

To this end, it issues a registration request 206 to a network access unit 201. For example the access unit is a P-CSCF ("Proxy-Call Session Control Function") unit, and the request is a "REGISTER" request according to the SIP protocol ("Session Initiation Protocol"). The access unit next transfers the request to a query unit 202 which will be responsible for determining a service unit 205 for registering the user and implementing the subsequent communications thereof. For example, the query unit is an I-CSCF ("Interrogating-Call Session Control Function") unit and the service unit is an S-CSCF ("Serving-Call Session Control Function") unit according to the 3GPP standard. The service unit will be responsible for the effective implementation of the communications once the user device has been registered, such as for example contact by the user device party, initiation of particular services, or other. The function of such a service unit will be familiar to a person skilled in the art.

On receiving the registration request, the query unit sends an identification request 207 to an authentication server 203. For example the authentication server is an HSS server ("Home Subscriber Server") according to the 3GPP standard. The request is for example a DIAMETER protocol request of the "User registration status query" type as defined in the document 3GPP TS 29.228.

The authentication server then verifies whether a service unit is already assigned to the user. If this is the case, the authentication server sends an identification of this service unit.

When this is not the case, the authentication server sends in response a list of characteristics relating to the subscriber associated with the user device. For example, these characteristics are "capabilities" within the meaning of the 3GPP standard. The characteristics can for example relate to a user profile, a location of the user device, or other.

It is assumed for example that an IMS network is deployed over a territory that the operator has divided into five geographical zones Z1, Z2, Z3, Z4, and Z5.

The operator has dedicated S-CSCF service units to different types of users, for example "general public" users and "professional" users.

It is then proposed to assign a service unit to each user (at initial registration), while respecting these characteristics (or constraints), by making a compromise between assigning a service unit situated in the geographical zone to which the user is attached, and the load level of the service units.

The operator then defines the following characteristics according to the following table:

| Characteristic | Meaning |
| --- | --- |
| 1 | Geographical zone Z1 |
| 2 | Geographical zone Z2 |
| 3 | Geographical zone Z3 |
| 4 | Geographical zone Z4 |
| 5 | Geographical zone Z5 |
| 11 | General public user |
| 12 | Professional user |

In this example, the characteristics are represented by integers. According to the 3GPP standard for example, the characteristics are represented by positive integers coded on 32 bits.

The query unit receives a list of these characteristics during step S30, then forms a symbolic address in order to interrogate an address server and retrieve the identification on the network of service units capable of implementing the communication according to the characteristics.

For example, the operator of the network assigns service units according to different combinations of the defined characteristics. The table below summarizes these assignments:

| Service unit | Geographical assignment | Service assignment |
| --- | --- | --- |
| cg1.example.com | Zone Z1 | General public |
| cg2.example.com | Zone Z1 | General public |
| cp.example.com | Zone Z1 | Professional |
| nog.example.com | Zone Z2 | General public |

| Service unit | Geographical assignment | Service assignment |
| --- | --- | --- |
| neg.example.com | Zone Z3 | General public |
| np.example.com | Zones Z2 and Z3 | Professional |
| seg.example.com | Zone Z4 | General public |
| sep.example.com | Zone Z4 | Professional |
| sog.example.com | Zone Z5 | General public |
| sop.example.com | Zone Z5 | Professional |

In order to form the symbolic address, the query unit has available a domain name which represents the common suffix of the symbolic addresses used in the network.

For example, the domain name is in the form "s-cscf.example.com". This domain name then denotes the server of the domain "example.com" that stores the address of the S-CSCF units.

The query unit begins by classifying the characteristics received during step S31. For example, it orders the characteristics in descending order.

This classification aims to reduce the number of combinations of characteristics to be identified on the network. Other types of classification can thus be envisaged.

For example, the query unit receives a list of characteristics represented by the integers 1 and 11. Next, it classifies the characteristics and concatenates them with the identifier in order to obtain the symbolic address "11-1.S-CSCF.example.com" during stage S32.

The symbolic address can also comprise an indication of the service and the protocol used.

The query unit then sends a resolve request 209 of the symbolic address formed to the address server 204 during step S33. For example, this is a DNS request of the SRV type the "QUESTION" section of which contains the following elements:

QNAME: _sip._udp,11-1.s-cscf.example.com
QTYPE: SRV
QCLASS: IN.

The prefixes "_sip" and "_udp" specify the service and the protocol used. The address server then selects one or more service units compatible with the characteristics contained in the symbolic address. Next, it returns a list 210 of the compatible service units. This list comprises for each service unit, a physical address of the latter on the network.

For example, according to an implementation of a DNS server, the address server returns the elements "RR SRV" ("Resource Records" of "SRV" type) and RR A ("Resource Records" of "A" type). A list of this type can comprise the following items of information:

NAME: _sip._udp, 11-1.s-scf.example.com
TYPE: SRV
CLASS: IN
TTL: 5
RDLENGTH: 25
RDATA: 0 57 5060 cg1.example.com.
NAME: _sip._udp, 11-1.s-scf.example.com
TYPE: SRV
CLASS: IN
TTL: 5
RDLENGTH: 25
RDATA: 0 55 5060 cg2.example.com.
NAME: cg1.example.com.
TYPE: A
CLASS: IN
TTL: 3600
RDLENGTH: 4
RDATA: 10.19.80.71
NAME: cg2.example.com.
TYPE: A
CLASS: IN
TTL: 3600
RDLENGTH: 4
RDATA: 10.19.80.92

The query unit receives the list during step S34 and selects a server 205 from the list during step S35. The query unit reads the associated physical address in order next to transmit the registration request 206 to the service unit. The service unit then returns an acceptance message 211 to the query unit which transmits it to the user device via the access unit.

The service unit then takes responsibility for implementing the requested communication.

Figure 4:
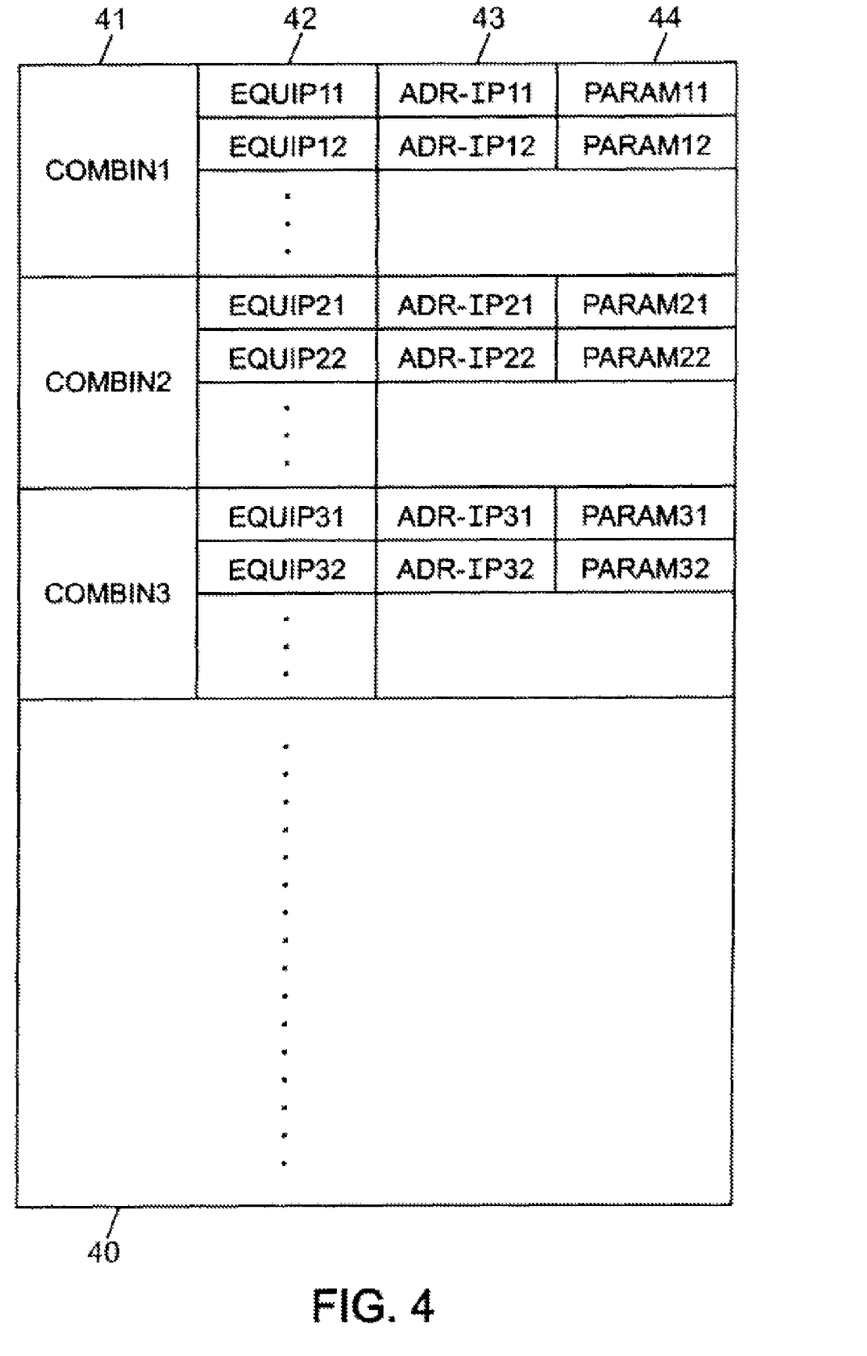
FIG. 4 shows an address table according to an embodiment of the invention

An address table of an address server according to an embodiment of the invention is now described, with reference to FIG. 4.

This table comprises different entries 40 for all the combinations COMBIN1, COMBIN2, COMBIN3, etc. of possible characteristics of the network.

In the example of the 3GPP standard, these are lists of numbers representing the capabilities of the network.

In order to allow a rapid identification of the combinations contained in the symbolic addresses sent by the query unit, the combinations are lists classified in descending order as is the case with the symbolic addresses. If another type of classification is used for implementing the symbolic addresses, the lists in the address table adopt the same order.

As already mentioned, this is to make it possible to avoid several entries actually representing the same list of characteristics, but in a different order.

For each entry, the table contains a set of compatible devices 42 (or RR SRV) with the characteristics of the entry in question. Associated with each device is an address data field 43, representing the physical address of the device on the network, for example its IP ("Internet Protocol") address, and a data field 44 representing a current load parameter of the device.

The current load parameter can for example correspond to the parameter "Weight" specified in the document IETF RFC 2782. This parameter is in this example a load parameter updated regularly by a network entity called LDF ("Load Detection Function", not shown) responsible for monitoring the load conditions of the devices. The higher the device load (the more the device is used) the lower the Weight field parameter. Dynamic updating of the Weight parameter can for example be done according to the standard RFC 2136.

In order to avoid redundancies in the address table, a tree structure can be used (not shown). In this structure, each node represents a characteristic. Each following node originating from a current node represents a characteristic according to the characteristic of the current node following the chosen classification of characteristics (in the example of the 3GPP standard, decreasing classification). Each current node is associated with a list of devices that are compatible with the current characteristic, and the characteristics associated with the nodes from which the current node originated.

Thus, as the address server receives a list of classified characteristics, it only needs to select as entry node the first characteristic contained in the symbolic address, then as following node, the second characteristic, and so on and so forth until reaching the last characteristic contained in the symbolic address. The list of compatible devices sent by the address server will then be the list of devices associated with the last-accessed node.

Before sending the list, the address server can order the devices according to their load parameter, for example in order to show first the least loaded devices.

Selection of the devices can thus be easily managed with updating of the address server table.

Figure 5:
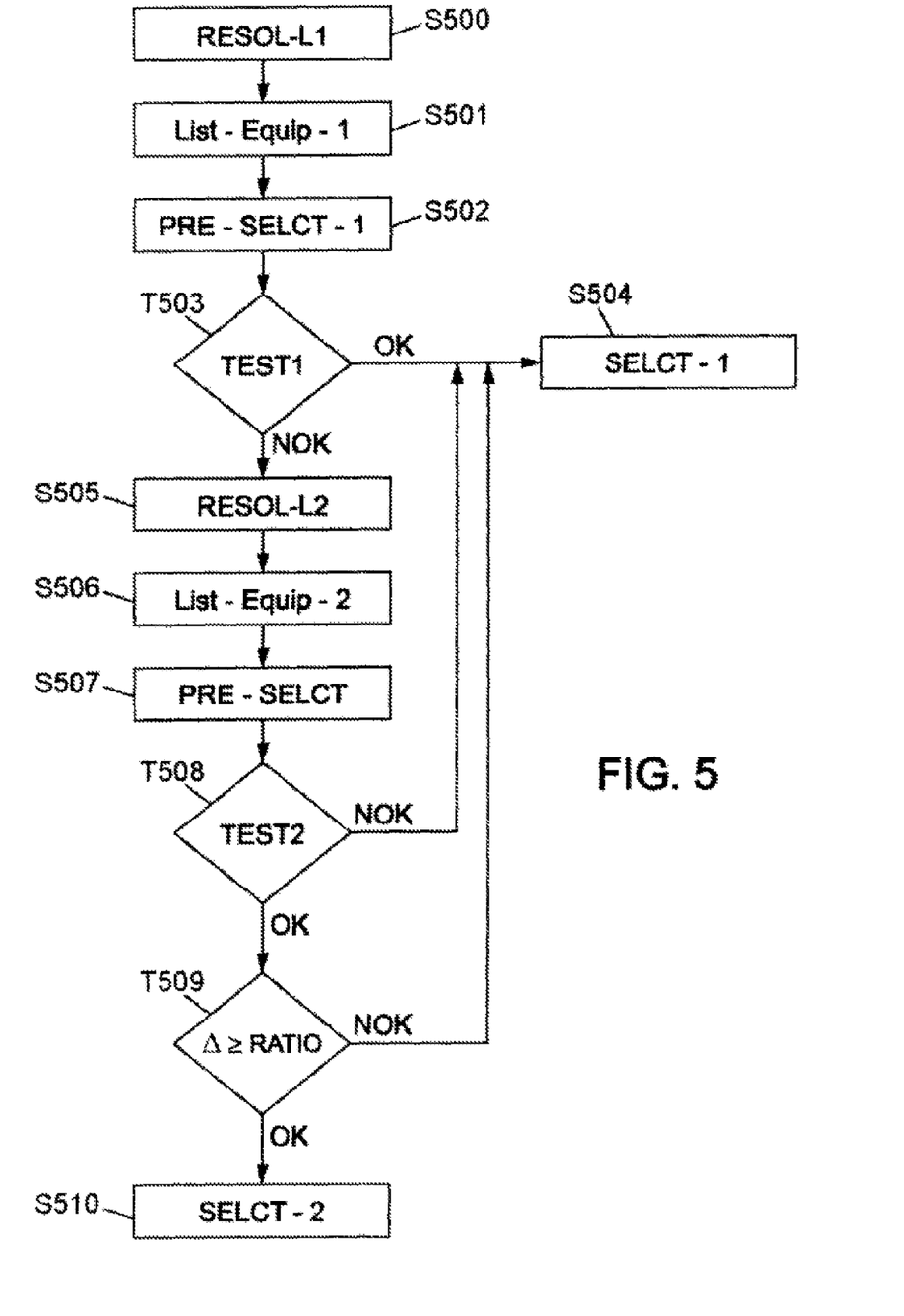
FIGS. 5 and 6 are flow charts showing steps implemented in a method according to other embodiments of the invention.

An embodiment of the selection of a device is now described, with reference to FIG. 5.

In this embodiment, it is assumed that on receipt of the characteristics, the query unit receives main (or mandatory) characteristics and secondary (or optional) characteristics according to two respective lists (or sub-lists) L1 and L2. It is assumed that the service can be implemented without the secondary characteristics, but must obligatorily be implemented with the main characteristics. For example, the main characteristics concern the user subscription, and the secondary characteristics concern quality of service parameters. Thus, the network will implement the communication according to the subscription and, if possible, with the best possible quality of service.

In this embodiment, during step S500, the address server is interrogated by using a symbolic address formed as described previously, with both the main characteristics and the secondary characteristics.

A first list of devices is then received in response during step S501.

From this list the device of which the current load is the least is preselected during step S502. In the example given above, the device for which the "Weight" field is the highest is chosen.

Test step T503 then follows to verify if this device satisfies a load test. For example, the value of the load parameter ("Weight") is compared to a threshold stored in the query unit.

The threshold can be determined by a person skilled in the art according to several criteria, according to the choice of the parameter for measuring the load of the service units.

If the test in step T503 is satisfied, for example the parameter is above or equal to the threshold, the device is effectively selected during step S504, and the registration request can be forwarded as already described.

If the test in step T503 is not satisfied, for example if the load parameter is below the threshold, a second symbolic address is formed as described previously, this time with the main characteristics only from the list L1. The secondary characteristics in the list L2 are ignored this time.

When this second symbolic address is formed, the address server is interrogated during step S505.

Next, during step S506, a second list of devices is received, and during step S507 the device on this list of which the load is the least is preselected.

The load test step T508 then follows. For example, this is the same test as that in step T503.

If the test in step T508 is negative, step S504 for selecting the device preselected during step S502 follows.

If the test in step T508 is positive, the test in step T509 follows. During this test, it is verified whether or not the load difference between the devices preselected during steps S502 and S507 justifies selecting a device which does not comply with the secondary characteristics (i.e. the device preselected during step S507).

For example, a ratio between the load parameters of the devices preselected during steps S602 and S507 is compared to a threshold previously stored in the query unit.

If the test in step S509 is negative, for example the ratio is below the threshold, the load difference between the two preselected devices is considered too small for the choice of a device that is not compatible with the secondary characteristics compared to a device that is compatible. A return is then made to step S504 in order to select the device preselected on the basis of the first list, as already described.

If the test in step S509 is positive, for example the ratio is above or equal to the threshold, there follows step S510 of selecting the device preselected during step S507, and the implementation of the communication is continued as already described.

A variant of the previous embodiment is now described with reference to FIG. 6.

As previously, it is assumed that when the characteristics are received, the query unit receives main characteristics and secondary characteristics according to two respective lists (or sub-lists) L1 and L2.

During step S600, the address server is interrogated using a symbolic address formed as described previously, with both the main characteristics in the list L1 and the secondary characteristics in the list L2.

A first list of devices is then received in response during step S601.

Test step T602 then follows in order to determine if, in the list of devices received, a device exists, the load of which is satisfactory for the implementation of the communication. For example, in the case of the 3GPP standard it is determined if there exists in the list a device of which the parameter "Weight" is above a threshold.

If the test in step T602 is positive, step S603 of selecting a device from the list then follows. This selection is made by random selection, weighted by the load parameter of the devices.

It is possible for example to apply a selection such as that specified in the standard RFC 2782.

Sliding sums are calculated from the "Weight" parameters associated with the devices. For example, if the devices have parameters 15, 3, 83, the associated sliding sums are respectively 15, 18 (=15+3), 101 (=15+3+8). An integer between 0 and the total sum of the parameters is then selected according to a uniform random selection, and the first device on the list is selected for which the associated sliding sum is greater than or equal to the integer selected. In the case of failure of connection with the selected device, this device is removed from the list and the selection procedure started again, until connection to a device is achieved.

If the test in step T602 is negative, i.e. in the list received during step S601 there is no device the current load of which is satisfactory, step S604 of preselecting the device the load of which is the least follows.

Next, a second symbolic address is formed as described previously, this time with only the main characteristics from the list L1. The secondary characteristics in the list L2 are ignored this time.

When this second symbolic address is formed, the address server is interrogated during step S605.

Next, during step S606 a second list of devices is received.

Test step T607 then follows, which is very similar to the test in step T602.

If the test in step T607 is negative, step S608 follows, for selecting the device preselected during step S604.

If the test in step T607 is positive test T609 follows, in order to determine if there exists in the list a device for which the ratio of the load parameter to the load parameter associated with the device preselected during step S604 is above a threshold or not.

The purpose of the test in step T609 is to verify if there exists in the list received, one or more devices for which the load level justifies selecting it rather than a device compatible with all the characteristics (main and secondary).

If the test in step T609 is negative, step S608 follows, if not, step T610 follows.

During step T610, a device is selected from the list in the same way as described for step S603.

The above-described embodiments were considered within the context of the 3GPP standard, but a person skilled in the art can find in the present description the elements allowing him to adapt the invention to standards and types of hardware other than those described herein by way of illustration.

Figure 6:
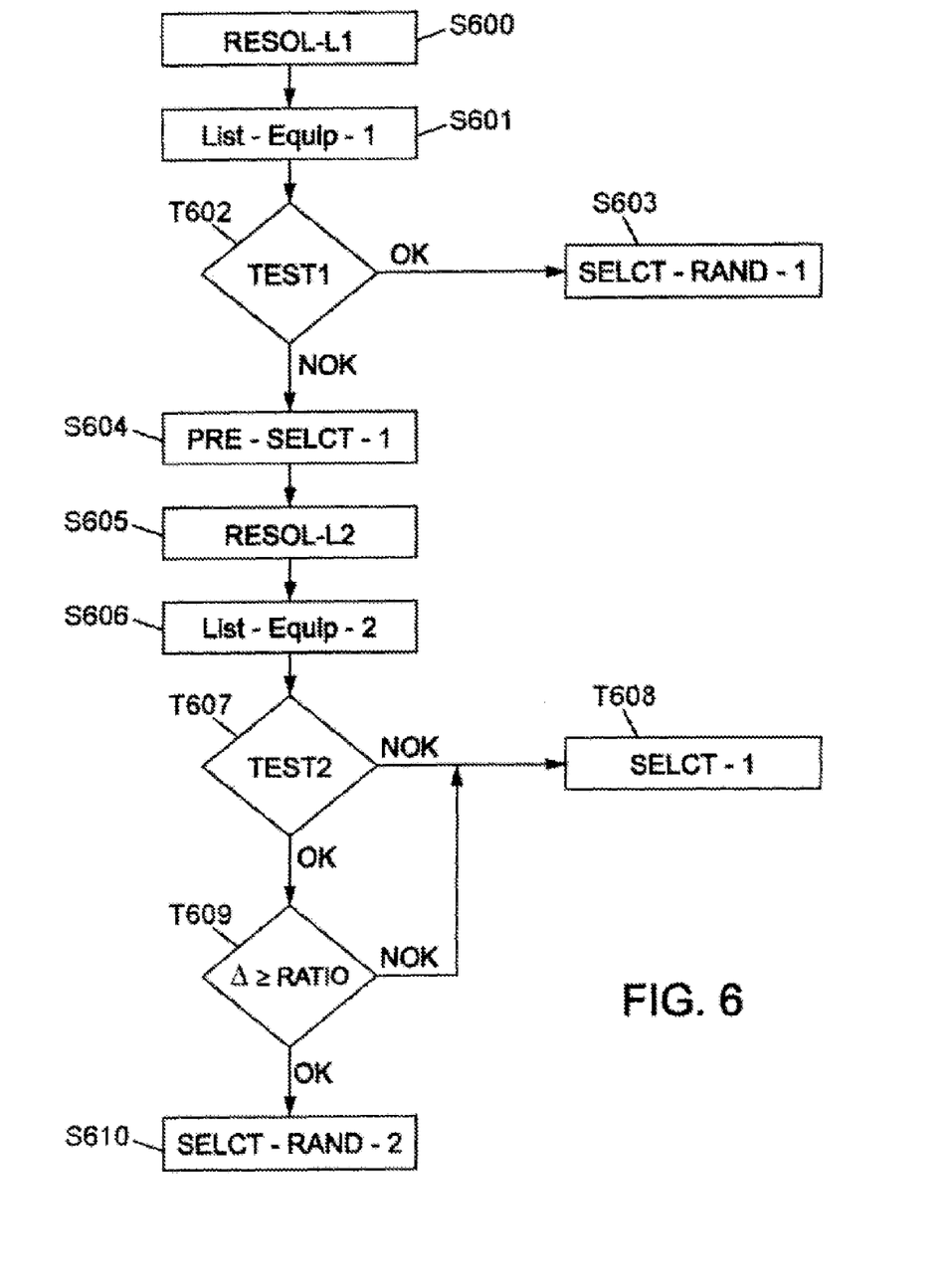

A computer program comprising instructions for the implementation of the method according to the invention can be produced according to a general algorithm deduced from the general flow charts in FIGS. 3, 5, and 6, the diagram in FIG. 2 and the present detailed description.

Figure 7:
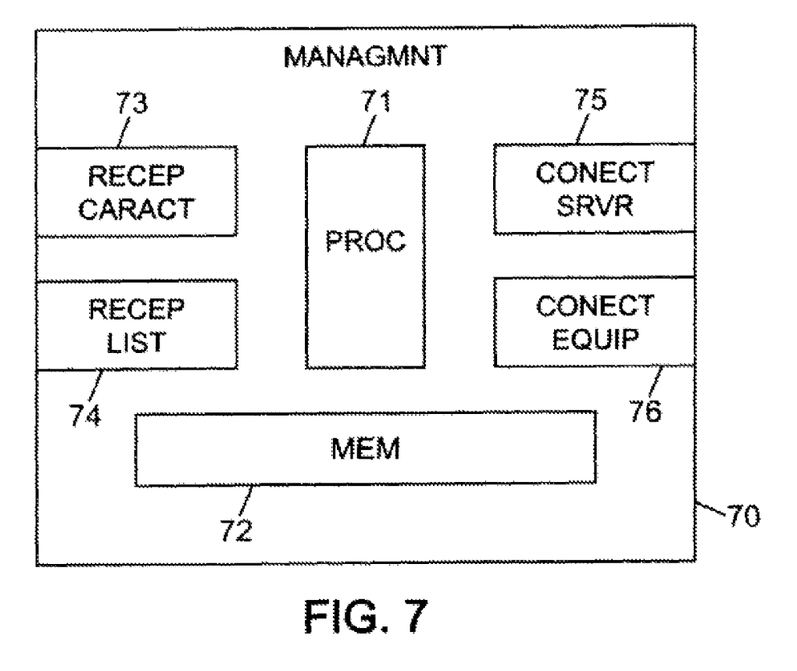
FIG. 7 shows diagrammatically a network management device according to an embodiment of the invention.

A management device according to an embodiment of the present invention is now described with reference to FIG. 7. For example, this device is a query unit of the I-CSCF type of an IMS network.

This device 70 comprises a processor unit 71 for implementing a method according to the present invention. To this end, it has a memory unit 72. This memory unit can comprise different types of memory. For example, the memory unit comprises a memory for storing calculation data. The memory unit can also comprise a memory for storing a computer program according to the present invention for its execution by a processor of the processor unit. The device also comprises communications ports, including inputs and outputs for communicating via a communications network. In particular, the device comprises an input 73 for receiving a set of characteristics, an input 74 for receiving a list of devices, an output 75 for connecting to an address server according to a symbolic address formed according to the invention, and an output 76 for connecting to a device selected according to the invention.

Figure 8:
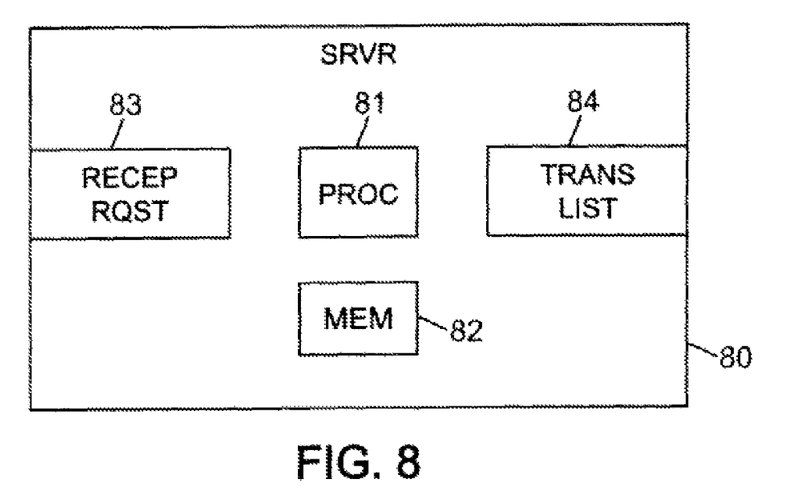
FIG. 8 shows diagrammatically an address server according to an embodiment of the invention.

An address server according to an embodiment of the present invention is now described with reference to FIG. 8.

This server 80 comprises a processor unit 81 for compiling a list of devices compatible with characteristics received in a symbolic address. The server also comprises a memory unit 82. This memory unit can comprise different types of memory. For example, the memory unit comprises a memory for storing calculation data. The memory unit can also comprise a memory for storing an address table according to the invention. The server also comprises inputs and outputs for communicating via a communications network. In particular, the device comprises an input 83 for receiving a request comprising communication characteristics and an output 84 for transmitting a list of devices according to the invention.

The invention has been described and illustrated in the present detailed description and in the figures. The present invention is not limited to the embodiments presented. Other variants and embodiments can be deduced and implemented by a person skilled in the art on reading the present description and from the attached figures.

In the claims, the term "comprise" does not exclude other elements or other steps. The indefinite article "a" does not exclude the plural. A single processor or several other units can be used in order to implement the invention. The different characteristics presented and/or claimed can advantageously be combined. Their presence in the description or in different dependent claims does not exclude this possibility. The reference marks are not to be understood as limiting the scope of the invention.

The invention claimed is:

1. A method for selecting a device in a telecommunications network as a function of capabilities associated with the implementation of a telecommunications service, a query unit being connected to the network, the method comprising the following steps:
   a) receiving by the query unit a set of capabilities associated with said service;
   b) forming by the query unit a first symbolic address for interrogating a DNS server, based on at least one part of the capabilities of said set on the one hand, and an address domain name on the other hand, the address domain name being a common suffix of addresses used for devices in the network;
   c) transmitting by the query unit the first symbolic address to the DNS server;
   d) receiving by the query unit from the DNS server a list of one or more devices based on said address domain name, and compatible with said at least one part of the capabilities of said set; and
   e) selecting by the query unit a device from the list;
   wherein the list of devices comprises for each device a second physical address of the latter on the network.

2. The method according to claim 1, wherein a communication session control unit is selected during the registration of a user.

3. The method according to claim 1, wherein the step of forming the first symbolic address comprises a concatenation of symbols representing the at least one part of the capabilities of said set, with the domain name.

4. The method according to claim 1, wherein the capabilities are represented by one or more symbols, and wherein the formation of the first symbolic address comprises the steps of:
   classifying the at least one part of the capabilities of the set;
   concatenating the symbols of the capabilities according to the classification used; and
   concatenating the string of concatenated symbols with the domain name.

5. The method according to claim 1, wherein the list of devices comprises for each device, a field representing a current usage load parameter of said device.

6. The method according to claim 5, wherein the selection of the device is based on the current load parameters of the devices in the list.

7. The method according to claim 5, wherein the set of capabilities comprises main capabilities and secondary capabilities, and wherein step b) is executed with said main capabilities and said secondary capabilities, the method comprising moreover the steps of:
   f) preselecting from the list of devices received during step d), the device having the least load;
   g) load test of the device preselected during step f) as a function of the associated load parameter; and
   h) selecting the device preselected during step f) if the load test in step g) is satisfied, or, if not
   i) repeating steps b) to d), with said main capabilities and without said secondary capabilities;
   j) preselecting from the list of devices received during step i), the device having the least load;

k) load test of the device preselected during step j) as a function of the associated load parameter and comparison of a load difference between the device preselected during step f) and the device preselected during step j) with a threshold; and l) selecting the device preselected during step j) if the load test in step k) is satisfied and if the difference is above the threshold, or if not, the device preselected during step f).

8. The method according to claim 5, wherein the set of capabilities comprises main capabilities and secondary capabilities, and wherein step b) is executed with said main capabilities and said secondary capabilities, the method comprising moreover the steps of:

m) load test of the devices on the list of devices received during step d), as a function of the load parameters associated with the devices;

then if the test in step m) is not satisfied for any of the devices on the list:

n) preselecting from the list of devices received during step d), the device having the least load;

o) repeating steps b) to d), with said main capabilities and without said secondary capabilities;

p) preselecting from the list of devices received during step o), the device having the least load;

q) load test of the device preselected during step p) as a function of the associated load parameter and comparison of a load difference between the device preselected during step n) and the device preselected during step p) with a threshold; and r) selecting a device from the list received during step o) by a random selection weighted by load parameters if the test in step q) is satisfied and if the difference is greater than the threshold, or if not, the device preselected during step n); or, if the test of step m) is satisfied:

s) selecting a device from the list received during step d) by a random selection weighted by the load parameters.

9. A non-transitory computer readable storage medium, for selecting a device in a telecommunications network as a function of capabilities associated with the implementation of a telecommunications service, having stored thereon a computer program comprising program instructions, the computer program being loadable into a data-processing unit and adapted to cause the data-processing unit to carry out, when the computer program is run by the data-processing device:

a) receiving a set of capabilities associated with said service;

b) forming a first symbolic address for interrogating an DNS server, based on at least one part of the capabilities of said set on the one hand, and an address domain name on the other hand, the address domain name being a common suffix of addresses used for devices in the network;

c) transmitting the first symbolic address to the DNS server;

d) receiving from the DNS server a list of one or more devices based on said address domain name, and compatible with said at least one part of the capabilities of said set; and e) selecting a device from the list;

wherein the list of devices comprises for each device a second physical address of the latter on the network.

10. A system comprising a telecommunications network management device connected to the network for selecting a device in the network as a function of capabilities associated with the implementation of a telecommunications service, comprising:

a first communications port for receiving a set of capabilities associated with said service;

a processor unit for forming a first symbolic address for interrogating an DNS server, based on at least one part of the capabilities of said set on the one hand, and an address domain name on the other hand, the address domain name being a common suffix of addresses used for devices in the network;

a second communications port for transmitting the first symbolic address to the DNS server;

a third communications port for receiving from the DNS server a list of one or more devices based on said address domain name, and compatible with said at least one part of the capabilities of said set; and wherein the processor unit selects a device from the list;

wherein the list of devices comprises for each device a second physical address of the latter on the network.

11. The system according to claim 10, further comprising a DNS server comprising a memory unit for storing an address table, said table comprising:

entries for combinations of capabilities for communication over a telecommunications network to which the server belongs;

for each entry, a list of devices of the network that are compatible with the corresponding combination of capabilities;

for each device in the list, a data field for a load parameter of use of the device, and a data field for locating the device on the network.

* * * * *